(12) United States Patent
Skaanning et al.

(10) Patent No.: US 6,456,622 B1
(45) Date of Patent: Sep. 24, 2002

(54) METHOD FOR KNOWLEDGE ACQUISITION FOR DIAGNOSTIC BAYESIAN NETWORKS

(75) Inventors: Claus Skaanning, Dronninglund (DK); Udde Kjærulff, AAlborg (DK); Finn V. Jensen, Broenderslv (DK)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/261,769

(22) Filed: Mar. 3, 1999

(51) Int. Cl.[7] .................................................. H04J 3/24
(52) U.S. Cl. ........................................ 370/389; 370/408
(58) Field of Search .............................. 370/389, 397, 370/399, 400, 254, 252, 256, 257, 255, 401, 403, 406, 407, 408, 409, 241, 216, 360, 372, 370; 706/59, 45, 12, 61, 20, 18; 707/33, 51, 10, 4, 104, 100, 103, 200, 522; 704/256, 231, 232

(56) References Cited

U.S. PATENT DOCUMENTS

| | | | |
|---|---|---|---|
| 4,591,983 A | 5/1986 | Bennett et al. | |
| 5,343,388 A | 8/1994 | Wedelin | |
| 5,479,576 A | 12/1995 | Watanabe et al. | |
| 5,493,729 A | 2/1996 | Nigawara et al. | |
| 5,546,502 A | 8/1996 | Hart et al. | |
| 5,671,333 A | 9/1997 | Catlett et al. | |
| 5,696,884 A | 12/1997 | Heckerman et al. | |
| 5,704,017 A | 12/1997 | Heckerman et al. | |
| 5,704,018 A | 12/1997 | Heckerman et al. | |
| 5,715,374 A | 2/1998 | Heckerman et al. | |
| 5,748,850 A | 5/1998 | Sakurai | |
| 5,768,422 A | 6/1998 | Yaeger | |
| 5,784,616 A | 7/1998 | Horvitz | |
| 6,154,736 A | * 11/2000 | Chickering | .................. 706/59 |
| 6,216,134 B1 | * 4/2001 | Heckesman et al. | ........ 707/104 |
| 6,336,108 B1 | * 1/2002 | Thiesson et al. | .............. 706/20 |

* cited by examiner

*Primary Examiner*—Dang Ton

(57) ABSTRACT

A Bayesian network includes a set of nodes representing discrete-valued variables. A plurality of arcs connect nodes from the set of nodes. The arcs represent the causal dependencies between the nodes. A prior marginal probability value is associated with each leaf node. The prior marginal probability values are calculated by first estimating conditional probabilities for nodes. For example, for each node with parent nodes, knowledge acquisition questions are developed which when answered will indicate the conditional probability of each parent node of the node. The questions and answer assume a single occurrence of a fault (the single-fault assumption). That is, it is assumed that one and only one variable represented by the plurality of parent nodes will be in its positive state (i.e., the fault will occur). Thus a sum of the conditional probabilities for all variables represented by all parent nodes for any particular node will always be equal to one. Constraint nodes are added to the Bayesian network to enforce the single occurrence assumption. In order to obtain a prior marginal probability for each leaf node, a conditional probability of the leaf node is multiplied with conditional probabilities for each node which is a descendent of the leaf node.

23 Claims, 5 Drawing Sheets

METHOD FOR KNOWLEDGE ACQUISITION FOR DIAGNOSTIC BAYESIAN NETWORKS

BACKGROUND OF THE INVENTION

This invention pertains generally to Bayesian networks, and more particularly to the acquisition of probabilistic knowledge pertaining to devices or systems being modeled from domain experts/knowledge engineers.

In scientific literature Bayesian networks are referred to by various names: Bayes nets, causal probabilistic networks, Bayesian belief networks or simply belief networks. Loosely defined Bayesian networks are a concise (acyclic) graphical structure for modeling probabilistic relationships among discrete random variables. Bayesian networks are used to efficiently model problem domains containing uncertainty in some manner and therein lies their utility. Since they can be easily modeled on a computer, they are the subject of increasing interest and use in automated decision-support systems, whether for medical diagnosis, automated automotive troubleshooting, economic or stock market forecasting or in other areas as mundane as predicting a computer user's likely requirements.

In general, a Bayesian network consists of a set of nodes representing discrete-valued variables connected by arcs representing the causal dependencies between the nodes. A set of conditional probability tables, one for each node, defines the dependency between the nodes and its parents. And, nodes without parents, sometimes called source nodes, have associated therewith a prior marginal probability table. In diagnostic Bayesian networks for technical diagnosis the conditional probability tables for most nodes with parents are logical OR's. For specific applications the data for the probability tables for all other nodes are provided by what is termed domain experts in whatever field is being modeled. This involves assigning prior probabilities for all nodes without parents, which in diagnostic Bayesian networks represent events causing malfunctions in the modeled device/system. In very large diagnostic Bayesian networks, most of the events are very rare with probabilities in the range of 0.001 to 0.000001. But, since a primary goal of a computer decision support system is to provide decisions as accurate as is possible, it is imperative that the domain experts provide probabilistic information that is highly reliable and their best estimate of the situation.

Diagnosis with Bayesian networks is fairly well understood [see for example, de Kleer, J. and Williams, B., "Diagnosing multiple faults" in *Artificial Intelligence*, 32:97–130 (1987); or Heckerman, D., Breese, J., and Rommelse, K., "Decision-theoretic Troubleshooting," in *Communications of the ACM*, 38:49–57 (1995)]. Having constructed a Bayesian network, it is possible by, e.g., using the methods of Heckerman et al., to construct a myopic troubleshooter that suggests optimal observations, repairs and configuration changes to obtain further information. The troubleshooter is termed myopic, because it only has a one-step lookahead. A typical application might be a LAN printer system which consists of several components: the application the computer user is printing from, the printer driver, the local area network connection, the server controlling the printer, the printer itself, etc. In general it is a complex task to troubleshoot such a system, and the computer printer industry spends significant sums of money on customer support. The majority of this expense is spent on labor, i.e., support agents that are sent out to repair printers that often are not broken, and solve problems that could have been handled by phone. Therefore, automating the troubleshooting process as much as possible would be highly beneficial to the printer industry and its customers.

When performing diagnosis in some particular problem area, it is almost always possible to represent the domain as a simple tree, if assuming a single fault only, such as depicted in FIG. 1 with the root problem node at the top level, problem categories at the next level, and then problems, causes, and subcauses, etc. Depending on the structure and size of the problem domain more or less levels are needed. If the single-fault assumption is made, and it is assumed that there are no common causes, the problem domain can be represented as a simple tree structure. The single-fault assumption is often a natural relationship as is discussed below. To model such a diagnostic tree in a computer with a diagnostic Bayesian network is very straightforward.

To develop a Bayesian network structure for the diagnosis of a system, such as a LAN printer system, requires conditional probabilities of the events causing the malfunctions of the modeled system. The required conditional probabilistic values must be directly elicited from domain experts in the field being modeled. In the example of a printer system, one would consult printer repair agents as the domain experts. There are inherently difficulties with eliciting expert probabilistic knowledge. For example, probability elicitations are often very difficult for domain experts due to the rarity of certain events being queried. This will often produce values of probability having a very low accuracy. This obviously is unacceptable since a diagnostic system based on probabilities of low accuracy will give suggestions of dubious value. Furthermore, as the elicitations increase in difficulty, more and more time will be spent on reaching an acceptable accuracy. This can be of great importance, as time consumption of knowledge acquisition is typically the bottleneck in projects involving the construction of very large diagnostic networks. A further problem even more subtle is the psychology of the situation. As the difficulty of these elicitations increases, the domain experts are less willing to cooperate in the process of knowledge acquisition and have less confidence in the knowledge they are providing. However, issues such as these are of high importance in projects involving a high amount of cooperation with domain experts.

One of the biggest stumbling blocks of the Bayesian network methodology is the requirement for large amounts of probability assessments. For example, a diagnostic Bayesian network for a printing system constructed according to generally accepted techniques requires prior probabilities for thousands of leaf variables. For any methodology of probability elicitation to be really useful, it must be fast and easy to assess these probabilities. Therefore, one of the main objects of this invention is to develop a method that makes it as easy as possible for domain experts to assess the probabilities, without increasing the number of assessments required and without jeopardizing the accuracy or the consistency of the probability assessments.

It is an object of this invention to have the domain experts answer easier questions than with previous approaches, allowing shorter answer-times and with higher accuracies of elicited probabilities. The invention details a method for implementing the acquired probabilities within a diagnostic Bayesian network.

SUMMARY OF THE INVENTION

In accordance with a preferred embodiment of the present invention a Bayesian network includes a set of nodes representing discrete-valued variables. A plurality of arcs connect nodes from the set of nodes. The arcs represent the causal dependencies between the nodes. A prior marginal probability value is associated with each leaf node (nodes without parents). The prior marginal probability values of the leaf nodes are calculated by first estimating conditional probabilities for all their descendent nodes. For example, for each node A with parent nodes, knowledge acquisition questions are developed which when answered will indicate one conditional probability for each parent node given A. The questions and answers assume a single occurrence of a fault (i.e., a single-fault assumption). That is, it is assumed that one and only one variable among the plurality of parent nodes will be in its positive state, i.e., a present fault. Thus a sum of the conditional probabilities of the parent nodes being in the positive states will always be equal to one. In order to obtain a prior marginal probability for each leaf node, a conditional probability of the leaf node is multiplied with conditional probabilities for each node which is a descendent of the leaf node.

In the preferred embodiment of the present invention, constraint variables are associated with the set of nodes. The constraint variables enforce the single-fault assumption between the causes represented by the nodes.

For example, when the Bayesian network is used for troubleshooting a product, such as a printer, a root node can represent a problem and parent nodes of the root node can represent causes of the problem. A cause can have parent nodes that are subcauses. When performing knowledge acquisition for the Bayesian network, it is assumed that there is a problem. For each potential cause of the problem, the conditional probability the problem was caused by the potential cause of the problem is estimated, given that the problem is present. For each potential cause that has subcauses, the conditional probability that a subcause underlies the potential cause is estimated, given that the problem is caused by the potential cause. And so on, until all leaf nodes for the Bayesian network have been reached.

In the preferred embodiment, a prior marginal probability of each leaf node is calculated by multiplying conditional probability of all nodes which descend from the leaf node.

The present invention involves knowledge acquisition questions that are easier to answer by the experts due to the larger amount of conditional information. This allows the domain experts to assess probabilities to a higher degree of accuracy than with the previous methods.

Further, the present invention also allows the domain experts to spend less time assessing the probabilities in an attempt to reach acceptable accuracy.

BRIEF DESCRIPTION OF THE DRAWINGS

For a better understanding of the invention as well as other objects and further features thereof, reference is made to the accompanying drawing wherein.

DETAILED DESCRIPTION OF THE PREFERRED EMBODIMENT

Figure 1:
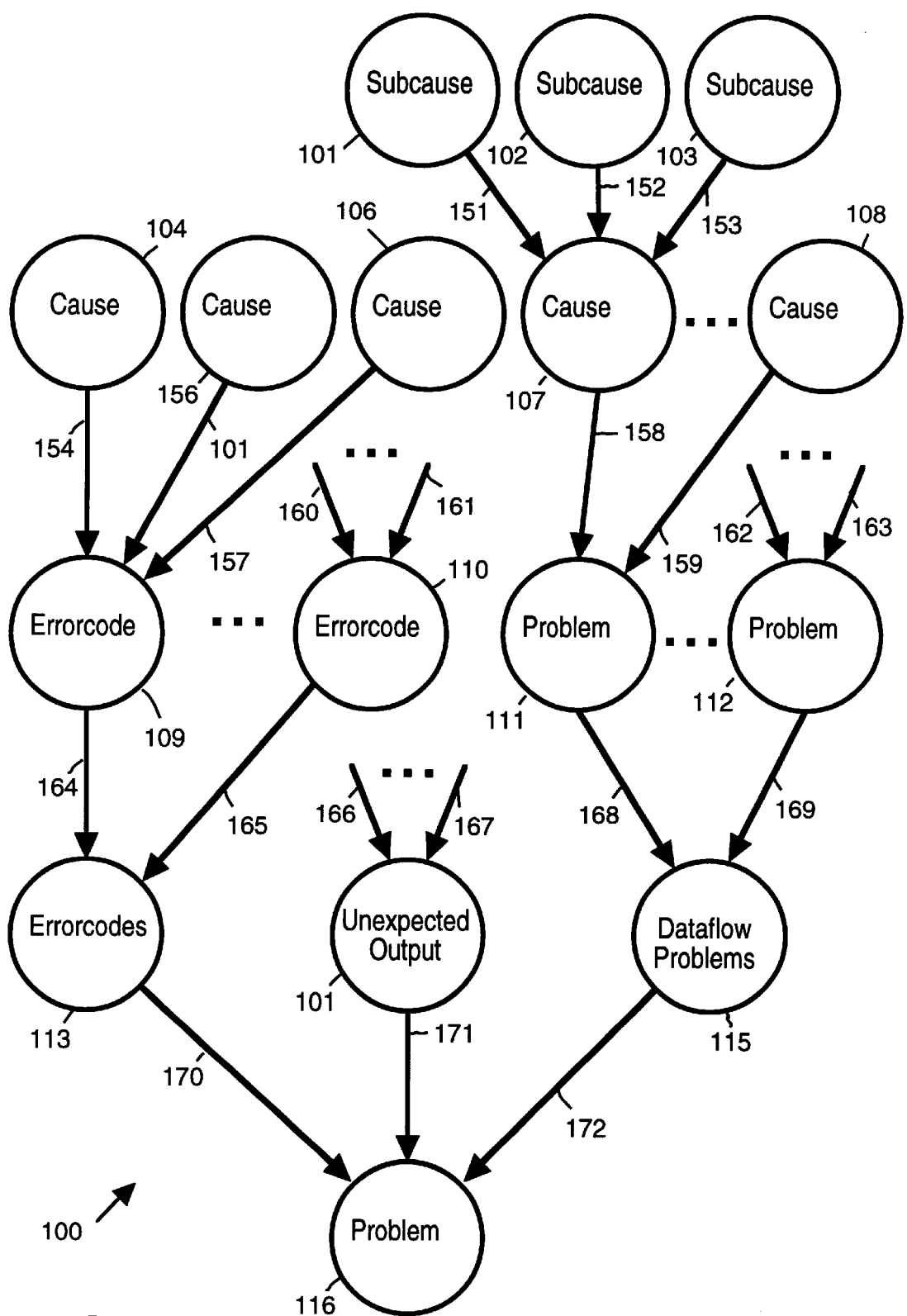
FIG. 1 depicts a diagram of a portion of a general Bayesian network diagnostic model represented as a simple tree.

Referring to FIG. 1 there is illustrated a portion of a general Bayesian network diagnostic model represented as a simple tree structure 100 which assumes a single fault problem structure. Nodes 101–116 represent the various variables in the network, and arcs 151–172 represent the probability distribution between the linked variables. Efficient methods for updating the probabilities in such Bayesian networks have been developed by, e.g., Lauritzen, S. L., and Spiegelhalter, D. J., "Local Computations with Probabilities on Graphical Structures and their Applications to Expert Systems," in *Journal of the Royal Statistical Society*, Series B, 50(2): 157–224 (1988) and Jensen, F. V., Lauritzen, S. L., and Olesen, K. G., "Bayesian Updating in Causal Probabilistic Networks by Local Computations," in *Computational Statistics Quarterly*, 4:269–282, (1990) and can be used for construction and belief updating in general Bayesian networks.

The Bayesian network shown in FIG. 1 is used for troubleshooting a particular device. The Bayesian network has, in general, n components (nodes) represented by the variables $c_1, \ldots, c_n$. In a printing system application, these components could for instance be the printer driver, the spooler, etc. Following the single-fault assumption, which specifies that exactly one component is malfunctioning and the cause of the problem, if $p_i$ denotes the probability that component $c_i$ is abnormal given the current state of information, then $\Sigma_{i=1}^{n} p_i = 1$ under the single-fault assumption. Each component $c_i$ has a cost of observation, denoted $C_i^o$ (measured in time and/or money), and a cost of repair $C_i^r$.

Under some additional mild assumptions, it can then be shown that with failure probabilities pi updated with current information, it is always optimal to observe the component that has the highest $p_i/C_i^o$ ratio. This is intuitive, as the ratio balances probability of failure with cost of observation and indicates the component with the highest probability of failure and the lowest cost of observation. Under the single-fault assumption, an optimal observation-repair sequence is thus given by the method set out in Table 1 below:

TABLE 1

| | |
|---|---|
| Step 1: | Compute the probabilities of component faults given that the device is not functioning. |
| Step 2: | Observe the component with the highest $p_i/C_i^o$ ratio. |
| Step 3: | If the component is faulty, repair it. |
| Step 4: | If a component is repaired, then terminate the diagnostic process. Otherwise, go to step 2. |

In the above plan, if a component is repaired in step 3, then because of the single-fault assumption, the device has been repaired, and the troubleshooting process is over. It is also possible to lift the single-fault assumption in which case step 1 must take into account all information found in previous iterations, and step 4 must be changed, as indicated by the new method set out in Table 2 below:

TABLE 2

Step 1: Compute the probabilities of component faults, taking into account information found in any previous iterations, given that the device is still not functioning.
Step 2: Observe the component with the highest $p_f/C_i^o$ ratio.
Step 3: If the component is faulty, repair it.
Step 4: If the device now functions, terminate the diagnostic process. Otherwise, go to step 1

Heckerman, D., Breese, J., and Rommelse, K., "Decision-theoretic Troubleshooting," *Communications of the ACM*, 1995, 38:49–57, also introduces a theory for handling a service call which is used when the expected cost of the most optimal troubleshooting sequence is higher. The paper discusses changes to the above plan that enables handling of systems with multiple faults and non- base observations which are observations on something that is not a component but potentially provides useful information to the troubleshooting process. In Breese, J. S. and Heckerman, D. "Decision-theoretic Troubleshooting: A Framework for Repair and Experiment", *Technical Report MSR-TR-96-06*, Microsoft Research, Advanced Technology Division, Microsoft Corporation, Redmond, USA (1996), configuration changes in the system are enabled to provide further useful information that can potentially lower the cost of the optimal troubleshooting sequence.

Figure 2:
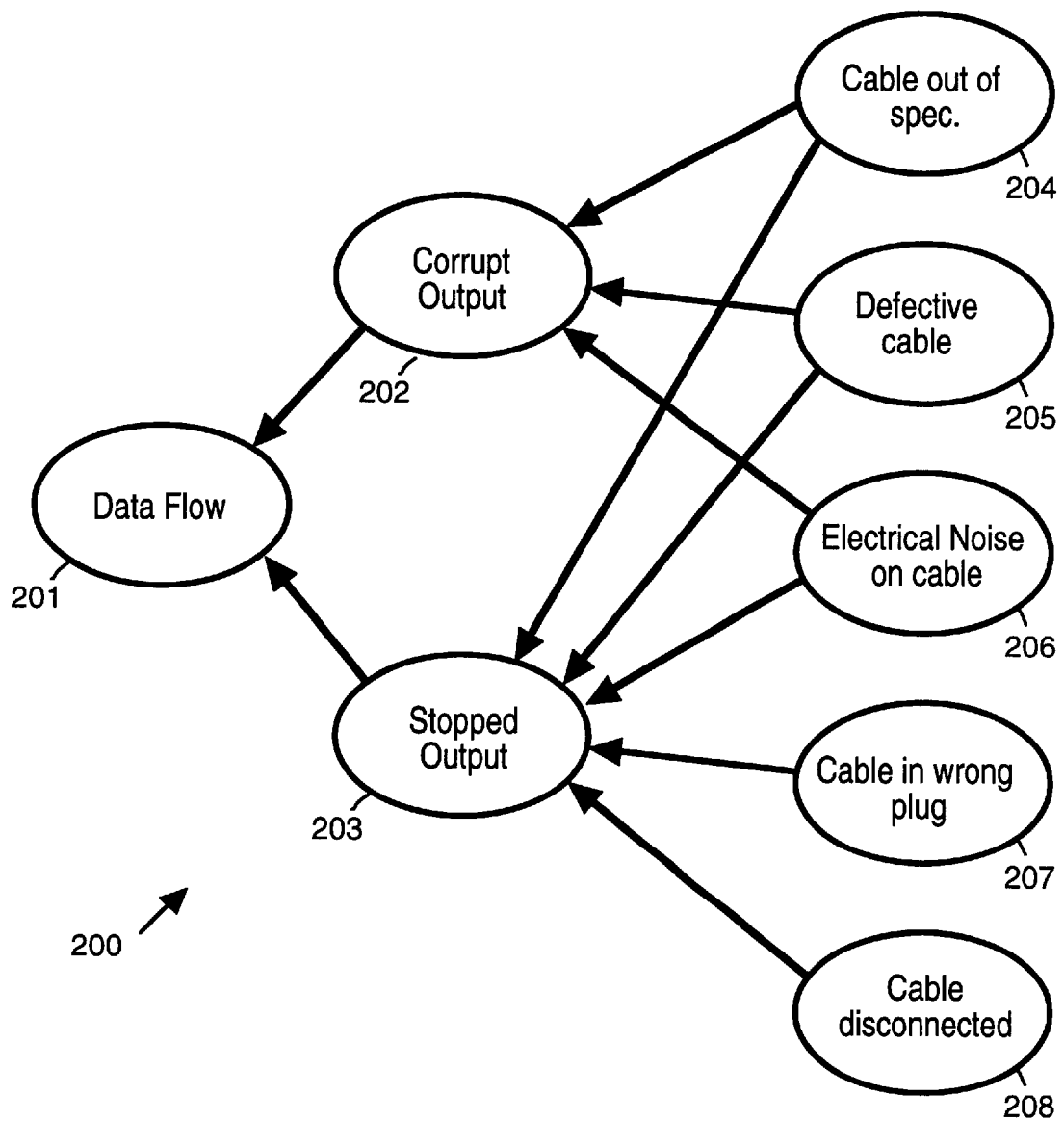
FIG. 2 depicts a Bayesian network diagnostic model for a computer printer parallel cable problem and its influences on the flow of data.

For illustration of this method, refer to the Bayesian network 200 shown in FIG. 2. Bayesian network 200 models a parallel cable (connecting a personal computer and a printer) and its potential influences on the data it carries. Considering the parallel cable component, it is clear that one must first assess he prior probabilities for the leaf variables, Cable out of spec 204, Defective cable 205, Electrical noise 206, Cable in wrong plug 207 and Cable disconnected 208. For this example, the standard method would be to ask a printer expert various questions to uncover the prior probabilities of each of the leaf variables:

What is the probability that the cable is out of spec such that it causes corruption of data?

What is the probability that the cable is out of spec such that data is stopped?

What is the probability that the cable is defective such that it causes corruption of data?

What is the probability that the cable is defective such that data is stopped?

What is the probability that electrical noise affects the cable such that data is corrupted?

What is the probability that electrical noise affects the cable such that data is stopped?

What is the probability that the cable is in the wrong plug?

What is the probability that the cable is disconnected?

These are not easy questions, as the knowledge expert must consider the general situation where no information at all is provided. The probabilities must be very small, e.g., 0.001 or 0.0001. However, it is very difficult to get more precise than this when considering such rare events. It may not be crucial whether a probability is estimated to be 0.0001 or 0.0002 (Henrion, M., Pradhan, M., del Favero, B., Huang, K., Provan, G., and O'Rorke, P., "Why is Diagnosis using Belief Networks Insensitive to Imprecision in Probabilities?", *Proceedings of the Twelfth Conference on Uncertainty in Artificial Intelligence*, (1996), but it is very important that the ratios between the probabilities are relatively accurate, i.e., if it is twice as likely for the cable to be disconnected than in the wrong plug, then the ratio between the probabilities must reflect this. This suggests that a better way of estimating the probabilities would be to consider sets of probabilities jointly. For instance, it seems easier to answer the following questions than the questions set out above:

Which is more likely, that the cable is in the wrong plug, or that it is disconnected?

If it is more likely that the cable is disconnected, how much more likely is it?

However, it is still very difficult for the domain experts to estimate the absolute size of the probabilities due to the rarity of the events if they are given very little (a priori) information about the state of the system. If instead the experts could work from the single-fault assumption that the output has stopped due to the parallel cable, it would be much easier to answer the above questions. The following scheme for finding the prior takes this into consideration, and requires the experts to elicit a set of likelihoods on all levels of the Bayesian network, given the information on the lower level.

Figure 3:
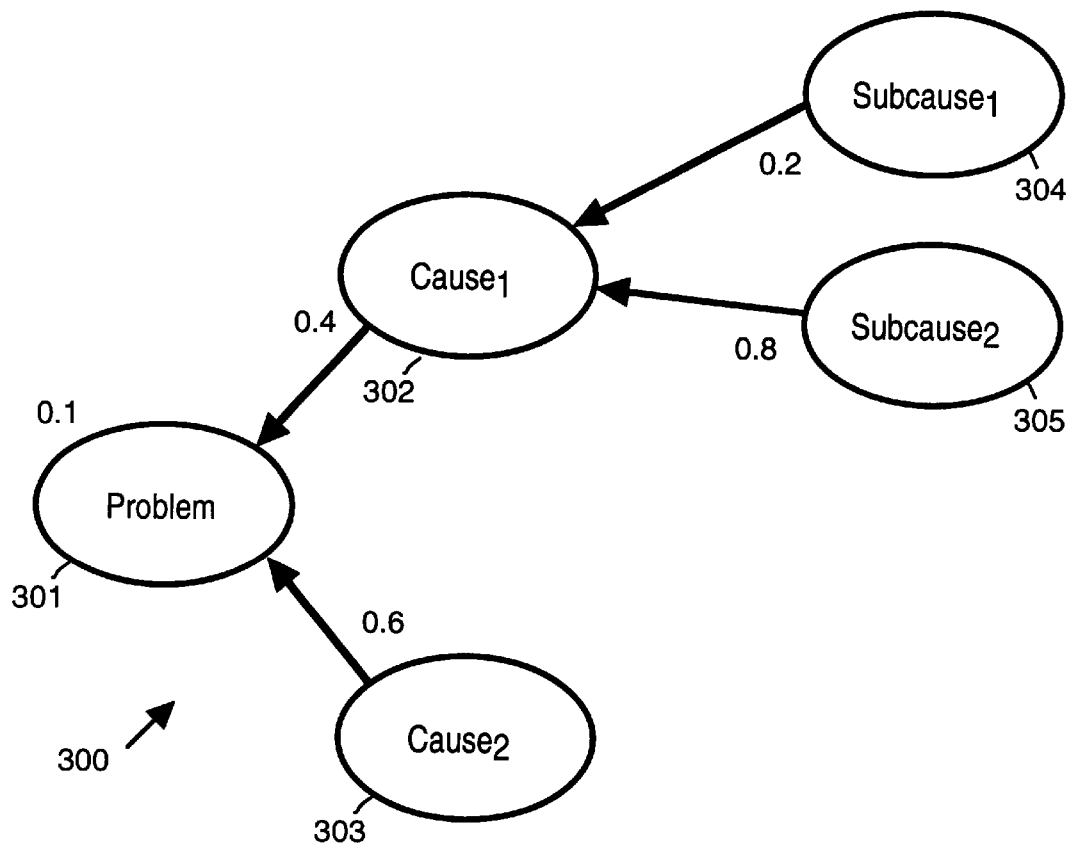
FIG. 3 depicts a Bayesian network diagnostic model for a single problem and two potential causes.

FIG. 3 shows an example Bayesian diagnosis network 300. Bayesian diagnosis network 300 is part of a much larger network. Bayesian diagnosis network 300 includes a problem that can be caused by any one of two causes. One of these causes, Cause$_1$ 302, can be caused by any one of two subcauses 304 or 305. The probability tables for Problem 301 and Cause$_1$ 302 are simple logical OR's. However, prior probabilities for the subcauses 304 and 305 and Cause$_2$ 303 are also needed. To find these probabilities, the domain experts are presented with the questions:

What is the probability that there is a problem 301 at all (Problem=yes)? (In this case, the expert assesses that in 10% of all situations there is an actual problem.)

Given that there is an actual problem (Problem=yes), what is the likeli-hood that Cause$_1$ 302 is the cause of problem 301, or that Cause$_2$ 303 is the cause of problem 301?

By following the single-fault assumption, the experts only have to consider the two scenarios where either Cause$_1$ or Cause$_2$ (302 or 303) is present and the other is not. In this case, the experts assess that in 40% of the cases, Cause$_1$ is the cause, and in 60% of the cases, Cause$_2$ is the cause.

Given that there is an actual problem (Problem=yes), and that Cause$_1$ caused that result, what is the likelihood that Subcause$_1$ is the underlying cause of Cause$_1$ or that Subcause$_2$ is the underlying cause?

Again, under the single-fault assumption it is only necessary to consider the two scenarios where Subcause$_1$ and Subcause$_2$ are not present simultaneously. The expert assesses that in 20% of the cases, Subcause$_1$ is the underlying cause, and in 80% of the cases Subcause$_2$.

Thus, in FIG. 3, estimates for the following probabilities as set out in

TABLE 3

P(Problem=yes) = 0.1,
P(Cause$_1$=yes | Problem=yes) = 0.4,
P(Cause$_2$=yes | Problem=yes) = 0.6,
P(Subcause$_1$=yes | Cause$_1$=yes) = 0.2, and
P(Subcause$_2$=yes | Cause$_1$=yes) = 0.8.

From the values given in Table 3, the equations set out in Table 4 below are generated

TABLE 4

P(Subcause$_1$=yes | Problem=yes)
= P(Subcause$_1$=yes | Cause$_1$=yes) × P(Cause$_1$=yes | Problem=yes)
= 0.2 × 0.4 = 0.08,    (Equation 1)
and thus
P(Subcause$_1$=yes) = P(Subcause$_1$=yes | Problem=yes) × P(Problem=yes)
= 0.08 × 0.1 = 0.008.    (Equation 2)

In the left hand side of Equation (1) is found the joint probability of Subcause$_1$ and Cause$_1$ given Problem=yes; however, it is not necessary to state Cause$_1$=yes, as this is automatically given when Subcause$_1$=yes, as Cause$_1$ is the logical OR of its subcauses. The same is the case in Equation (2).

Thus, for all the variables with no parents, the prior probability can be found by multiplying together the likelihoods of all causes on the path from the root to the variable in question.

When using the Bayesian network shown in FIG. 3, it is desired that the posterior probabilities of the variables are equal to those elicited by the experts. However, this is not what is obtained when directly using the probabilities from Equation (2) as the prior probabilities in FIG. 3. The reason for this is that the network in FIG. 3 does not enforce the single-fault assumption, e.g., it is possible for both Cause$_1$ and Cause$_2$ to be in their yes state. Thus, after belief updating, the probability that Cause$_1$ is present will be different from the 0.4 specified by the experts, and the ratio between the probabilities of Cause$_1$ and Cause$_2$ will be different from 0.4/0.6, due to the fact that Cause$_1$ has subcauses that can be present simultaneously while Cause$_2$ does not.

Figure 4:
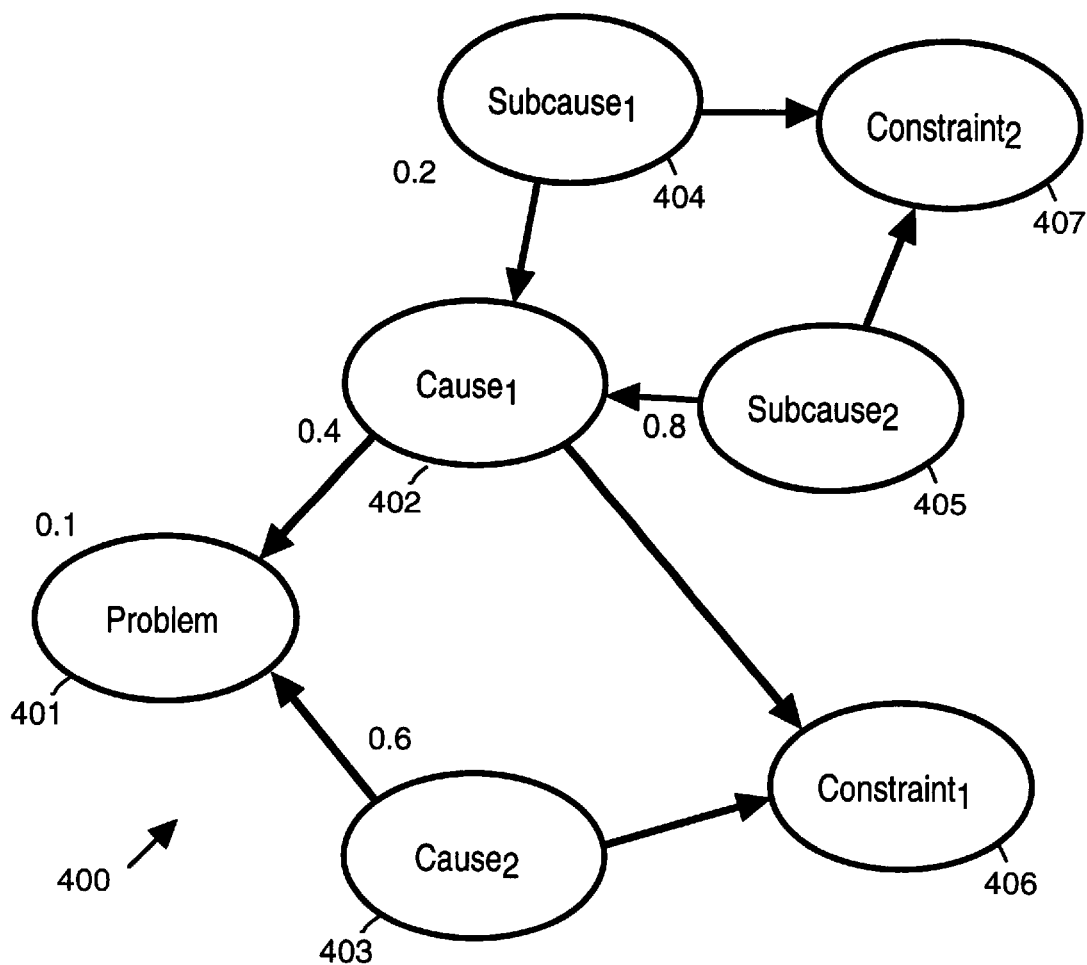
FIG. 4 depicts a Bayesian network diagnostic model where constraint variables have been added in order to enforce the single-fault assumption and the correct probabilities in accordance with a preferred embodiment of the present invention.

Referring to FIG. 4, there is an example Bayesian diagnosis network 400, where the single-fault assumption is resolved by the addition of constraint variables 406 and 407 at each level of the network as shown. Each of these constraint variables must always be set to the on state, thus only allowing configurations with a maximum of one fault. When the constraint variables 406 and 407 are fixed to the on state, they also enforce the correct probability distribution on variables when Problem=yes. As an example, in this case, the probability distribution for Constraint$_1$ 406 is as is set out in Table 5 below:

TABLE 5

| Cause$_1$ | yes | | no | |
|---|---|---|---|---|
| Cause$_2$ | yes | no | yes | no |
| Constraint$_1$ = on | 0 | 0.04 | 0.06 | 0.9 |
| Constraint$_1$ = off | 1 | 0.96 | 0.94 | 0.1 |

Thus, when Constraint$_1$ is fixed to on, the marginal probabilities of the four configurations of Cause$_1$ and Cause$_2$ are obtained when the constraint is used, as set out in Table 6 below:

TABLE 6

| Cause$_1$ | Cause$_2$ | Probability |
|---|---|---|
| yes | yes | 0 |
| yes | no | 0.04 |
| no | yes | 0.06 |
| no | no | 0.9 |

When Problem 401 is observed to be present (in the yes state), the configurations where either both Cause$_1$ 402 and Cause$_2$ 403 are present or both of them are not present are ruled out, leaving correct probabilities to configurations where one of the causes is in the yes state by normalizing over 0.04 and 0.06, i.e., obtaining 0.4 and 0.6. When Problem 401 is not observed, the constraint will enforce the wanted distribution on Problem 401, i.e., (yes: 0.1, no: 0.9).

The second constraint variable, Constraint$_2$ 407 acts in a similar way to enforce the single-fault assumption and the correct probabilities on the subcauses 404 and 405. Thus, when Cause$_1$ 402 is present, the subcauses will have the probabilities specified by the experts, 0.2 and 0.8.

In general, the constraints can be used to enforce the wanted prior probabilities on all variables given the single-fault assumption. As an example, assume that the prior probability f or Problem=yes is z. Also, assume that given Problem=yes, the probability of Cause$_1$=yes is x (and 1−x for Cause$_2$). If then Constraint$_1$ 406 is given the probability table in Table 3, the prior probabilities of Problem=yes, Cause$_1$=yes and Cause$_2$=yes will be as desired after fixing Constraint$_1$ in the state on. This is illustrated by Table 7 below:

TABLE 7

| Cause$_1$ | yes | | no | |
|---|---|---|---|---|
| Cause$_2$ | yes | no | yes | no |
| Constraint$_1$ = on | 0 | xz | (1−x)z | (1−z) |
| Constraint$_1$ = off | 1 | 1−xz | 1−(1−x)z | z |

Using the probabilities in Table 7 for Constraint$_1$ 406 and fixing it to the on state enforces the correct prior probabilities on Problem 401. The yes state of Problem 401 corresponds to either Cause$_1$ 402 or Cause$_2$ 403 being in their yes state with a probability of xz+(1−x)z=z. The no state of Problem 401 corresponds to both Cause$_1$ 402 and Cause$_2$ 403 being in their no state with a probability of (1−z). Thus Problem 401 will have the prior probabilities (z,1−z) as desired.

Fixing Problem 401 in its yes state enforces the correct prior probabilities on both Cause$_1$ 402 and Cause$_2$ 403. When Problem=yes, only the configurations where one of both Cause$_1$ 402 and Cause$_2$ 403 is in their yes state are allowed. The configuration where Cause$_1$=yes gets a probability of xz in Table 3, and the configuration where Cause$_2$=yes gets a probability of (1−x)z. Normalizing these probabilities yields the wanted prior probabilities for either Cause$_1$ or Cause$_2$ being the cause: (x,1−x).

In a similar manner probability tables for constraints on causes with subcauses can be constructed. If, in FIG. 4, the probability of Cause$_1$=yes is estimated to z, and the probabilities of the subcauses, Subcause, and Subcause$_2$ given Cause$_1$=yes are estimated to x and 1−x, the probability table of Constraint$_2$ can be found with Table 4. The only differences from Table 3, are that the last column now has a uniform distribution, and that z is not a parameter. If Table 3 had been used instead, both Constraint$_1$ and Constraint$_2$ would have enforced the wanted prior probabilities on Cause$_1$ yielding the wrong results. Thus, Constraint$_2$ enforces a uniform distribution on Cause$_1$ leaving it up to Constraint$_1$ to enforce the correct distribution on Cause$_1$. Table 8 below is a probability table for enforcing correct prior probabilities on causes with subcauses.

TABLE 8

| | Cause₁ | | | |
|---|---|---|---|---|
| | yes | | no | |
| Cause₂ | yes | no | yes | no |
| Constraint₁ = on | 0 | x/2 | (1-x)/2 | 0.5 |
| Constraint₁ = off | 1 | 1-x/2 | 1-(1-x)/2 | 0.5 |

This allows for easy and intuitive gathering of probabilities, and incorporation of them into a Bayesian network that follows the single-fault assumption.

Figure 5:
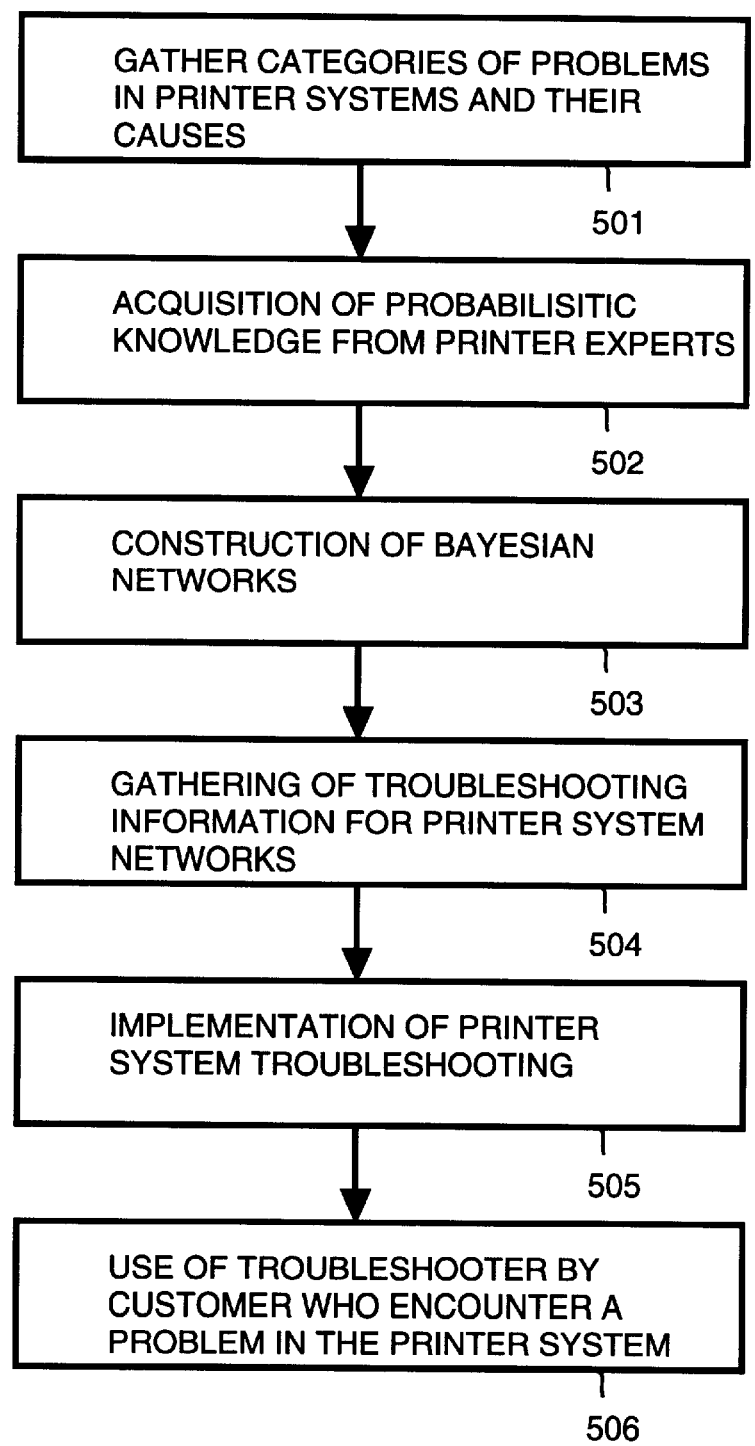
FIG. 5 is a high-level flowchart that shows an implementation of a troubleshooting system for printers in accordance with a preferred embodiment of the present invention.

FIG. 5 is a flowchart which shows how the present invention can be implemented in the development and use of a troubleshooting system for printers.

In step 501, categories of problems in printer systems and their causes are gathered. This results in construction of the basic form for the Bayesian network using a single-fault assumption.

In step 502, probabilistic knowledge is acquired from printer experts. This is performed, as discussed above. For each potential cause of the problem, the likelihood that the problem was caused by the potential cause of the problem is estimated, given that that the problem is present. For each potential cause which has subcauses, the likelihood that the subcause underlies the potential cause is estimated, given that the problem is caused by the potential cause.

In step 503, the acquired probabilistic knowledge is used to construct the Bayesian network. As discussed above, in order to enforce the single-fault assumption and the correct probabilities, constraint nodes are added to the Bayesian network.

In step 504, troubleshooting information for printer system networks is also gathered. With this information and the Bayesian network, in step 505, troubleshooting system for the printer system is implemented.

In step 506, a customer uses the troubleshooting system when the customer encounters a problem in the printer system.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for efficient construction and use of a decision support system, the method comprising the following steps:
   (a) storing in a memory of a computing system a Bayesian network as a tree structure having leaf nodes which have no parent nodes and other nodes which have parent nodes, each node for the tree structure representing a variable;
   (b) for each node that has a plurality of parent nodes, developing knowledge acquisition questions that when answered will indicate conditional probability for each parent node given one of the plurality of parent nodes is in a positive state, including the following substeps:
      (b.1) when developing knowledge acquisition questions, assuming that for each node one and only one variable represented by the plurality of parent nodes will be in a positive state,
      (b.2) storing the knowledge acquisition questions along with the Bayesian network;
   (c) obtaining answers to a subset of the knowledge acquisition questions, and
   (d) calculating prior marginal probabilities for each leaf node based on conditional probabilities obtained from the answers to the subset of the knowledge acquisition questions, the answers being used in constructing the Bayesian network
   (e) supporting, by the decision support system, decision making by a user, including the following substep:
      using the Bayesian network by the decision support system when supporting decision making by the user.

2. A method as in claim 1 wherein step (d) includes the following substep:
   in order to obtain a prior marginal probability for each leaf node, multiplying the conditional probabilities for each node which is a descendent of each leaf node.

3. A method as in claim 1 wherein in step (a), a root node for the tree structure represents a problem and parent nodes for the root node represent causes of the problem.

4. A method as in claim 1 wherein in step (a), a root node for the tree structure represents a problem, parent nodes for the root node represent causes of the problem, and any subsequent levels of nodes represent sub-causes.

5. A method as in claim 4 wherein in step (c) the answers are obtained from domain experts who have expertise in the problem, causes and subcauses of the problem.

6. Storage media that stores an executable program, the executable program including a Bayesian network, the Bayesian network comprising:
   a set of nodes representing discrete-valued variables;
   a plurality of arcs connecting nodes from the set of nodes, the arcs representing causal dependencies between the nodes; and,
   a set of prior marginal probability values, one prior marginal probability value associated with each leaf node;
   wherein the prior marginal probability values are calculated as follows:
      for each node A with a plurality of parent nodes, estimating a conditional probability for each parent node given node A is in a positive state so that a sum of conditional probabilities for all the parent nodes is equal to one, and
      in order to find obtain a prior marginal probability for each leaf node, multiplying conditional probabilities for each node which is a descendent of the leaf node; and,
   wherein when executed the executable program acts as a decision support system that utilizes the Bayesian network.

7. Storage media as in claim 6 wherein the conditional probability for each parent node of node A is obtained by developing knowledge acquisition questions which when answered will indicate conditional probability of each parent node assuming that one and only one parent node of node A will be in a positive state.

8. Storage media as in claim 6, wherein the Bayesian network additionally comprises:
   constraint variables associated with the set of nodes, the constraint variables enforcing a single-fault assumption between the nodes.

9. A method for constructing and utilizing a decision support system, the method comprising the following steps:
   (a) performing efficient knowledge acquisition for a Bayesian network to be used within the decision support system, including the following substeps:

(a.1) estimating a conditional probability that there is a problem;
(a.2) for each potential cause of the problem, performing the following substep:
(a.2.1) estimating a conditional probability that the problem was caused by the potential cause of the problem, given that the problem is present; and,
(a.3) for each potential cause which has subcauses, performing the following substep for each subcause:
(a.3.1) estimating a conditional probability that the subcause underlies the potential cause, given that the problem is caused by the potential cause; and,
(b) utilizing the Bayesian network when performing decision support with the decision support system.

10. A method as in claim 9 wherein step (a) additionally includes the following substep performed recursively:
(a.4) for each subcause which has additional subcauses, performing the following substep for each additional subcause of the subcause:
(a.4.1) estimating a conditional probability that the additional subcause underlies the subcause, given that the problem is caused by the subcause.

11. A method as in claim 9 wherein estimates are performed by posing knowledge acquisition questions to domain experts.

12. A method as in claim 9 wherein step (a) additionally includes the following substep:
(a.4) for each cause and subcause of the Bayesian network which represents a leaf node of the Bayesian network, calculating a prior marginal probability for the leaf node by multiplying conditional probabilities of all nodes which descend from the leaf node.

13. A method as in claim 9 wherein step (a) additionally includes the following substep:
(a.4) adding constraint variables to the Bayesian network to enforce a single-fault assumption.

14. A method for constructing and using a Bayesian network, comprising the following substeps
(a) constructing a basic form for the Bayesian network using a single-fault assumption:
(b) performing knowledge acquisition for the Bayesian network, comprising the following substeps:
(b.1) estimating a conditional probability that there is a problem;
(b.2) for each potential cause of the problem, performing the following substep:
(b.2.1) estimating a conditional probability that the problem was caused by the potential cause of the problem, given that the problem is present; and,
(b.3) for each potential cause which has subcauses, performing the following substep for each subcause:
(b.3.1) estimating a conditional probability that the subcause underlies the potential cause, given that the problem is caused by the potential cause;
(c) using the Bayesian network as part of a decision support system.

15. A method as in claim 14 wherein step (b) additionally comprises the following substep:
(b.4) for each subcause which has additional subcauses, performing the following substep for each additional subcause of the subcause:
(d.4.1) estimating a conditional probability that the additional subcause underlies the subcause, given that the problem is caused by the subcause.

16. A method as in claim 14 wherein in substep (b.1), substep (b.2.1) and substep (b.3.1), the estimates are performed by posing knowledge acquisition questions to domain experts.

17. A method as in claim 14 wherein step (b) additionally comprises the following substep:
(b.4) for each cause and subcause of the Bayesian network which represents a leaf node of the Bayesian network, calculating a prior marginal probability for the leaf node by multiplying conditional probabilities of all nodes which descend from the leaf node.

18. A method as in claim 14 additionally comprising the following step performed before step (c):
(d) adding constraint variables to the Bayesian network to enforce the single-fault assumption.

19. A method used for efficient construction of a Bayesian network, the method comprising the following steps:
(a) storing in a memory of a computing system an executable program that includes a representation of at least a portion of the Bayesian network as a tree structure having leaf nodes which have no parent nodes and other nodes which have parent nodes, each node for the tree structure representing a variable;
(b) for each node that has a plurality of parent nodes, developing knowledge acquisition questions that when answered will indicate conditional probability for each parent node given one of the plurality of parent nodes is in a positive state, including the following substeps:
(b.1) when developing knowledge acquisition questions, assuming that for each node one and only one variable represented by the plurality of parent nodes will be in a positive state,
(b.2) storing the knowledge acquisition questions along with the Bayesian network;
(c) executing the stored program, including the following substeps performed by the computing system as directed by the executing stored program:
(c.1) obtaining answers to a subset of the knowledge acquisition questions, and
(c.2) calculating prior marginal probabilities for each leaf node based on conditional probabilities obtained from the answers to the subset of the knowledge acquisition questions, the answers being used by the executable program in constructing the Bayesian network.

20. A method as in claim 19 wherein substep (c.2) includes the following substep:
in order to obtain a prior marginal probability for each leaf node, multiplying the conditional probabilities for each node which is a descendent of each leaf node.

21. A method as in claim 19 wherein in step (a), a root node for the tree structure represents a problem and parent nodes for the root node represent causes of the problem.

22. A method as in claim 19 wherein in step (a), a root node for the tree structure represents a problem, parent nodes for the root node represent causes of the problem, and any subsequent levels of nodes represent sub-causes.

23. A method as in claim 19 wherein in substep (c.19) the answers are obtained from domain experts who have expertise in the problem, causes and subcauses of the problem.

* * * * *

UNITED STATES PATENT AND TRADEMARK OFFICE
CERTIFICATE OF CORRECTION

PATENT NO. : 6,456,622 B1
DATED : September 24, 2002
INVENTOR(S) : Claus Skaanning et al.

It is certified that error appears in the above-identified patent and that said Letters Patent is hereby corrected as shown below:

Title page,
Item [75], Inventors, delete "Claus Skaanning, Dronninglund (DK); Udde Kjaerulff, AAlborg (DK); Finn V. Jensen, Broenderslv (DK)" and insert therefor -- Claus Skaanning, Dronninglund (DK); Finn V. Jensen, Broendersly (DK); Uffe Kjaerulff, Aalborg (DK) --

Signed and Sealed this

Twenty-eighth Day of December, 2004

JON W. DUDAS
*Director of the United States Patent and Trademark Office*